(12) United States Patent
Lee et al.

(10) Patent No.: US 10,798,416 B2
(45) Date of Patent: Oct. 6, 2020

(54) APPARATUS AND METHOD FOR MOTION ESTIMATION OF THREE DIMENSION VIDEO

(71) Applicant: SAMSUNG ELECTRONICS CO., LTD., Suwon-si (KR)

(72) Inventors: Jin Young Lee, Ansan-si (KR); Du-Sik Park, Suwon-si (KR); Jaejoon Lee, Seoul (KR); Ho Cheon Wey, Seongnam-si (KR); Il Soon Lim, Hongseong-gun (KR); Seok Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1007 days.

(21) Appl. No.: 14/922,714

(22) Filed: Oct. 26, 2015

(65) Prior Publication Data

US 2016/0044338 A1 Feb. 11, 2016

Related U.S. Application Data

(63) Continuation of application No. 12/805,760, filed on Aug. 18, 2010, now Pat. No. 9,171,376.

(30) Foreign Application Priority Data

Sep. 22, 2009 (KR) .................. 10-2009-0089356

(51) Int. Cl.
*H04N 19/597* (2014.01)
*H04N 5/14* (2006.01)
(Continued)

(52) U.S. Cl.
CPC ............ *H04N 19/597* (2014.11); *G06T 7/20* (2013.01); *G06T 7/90* (2017.01); *H04N 5/145* (2013.01);
(Continued)

(58) Field of Classification Search
CPC .................................................. H04N 19/597
See application file for complete search history.

(56) References Cited

U.S. PATENT DOCUMENTS 7,643,096 B2 1/2010 Kondo et al.
8,160,136 B2 4/2012 Sezer
(Continued)

FOREIGN PATENT DOCUMENTS

KR 10-2005-0061762 A 6/2005
KR 10-2007-0055903 A 5/2007
(Continued)

OTHER PUBLICATIONS

Korean Office Action dated Jan. 19, 2016, in counterpart Korean Application No. 10-2009-0089356 (3 pages in English, 4 pages in Korean).
(Continued)

*Primary Examiner* — Tracy Y. Li
(74) *Attorney, Agent, or Firm* — NSIP Law

(57) ABSTRACT

Disclosed is a 3D video motion estimating apparatus and method. The 3D video motion estimating apparatus may enable a motion vector of a color image and a motion vector of a depth image refer to each other, thereby increasing a compression rate.

7 Claims, 9 Drawing Sheets

(51) Int. Cl.
*H04N 19/56* (2014.01)
*H04N 19/105* (2014.01)
*H04N 19/176* (2014.01)
*H04N 19/147* (2014.01)
*H04N 19/19* (2014.01)
*H04N 19/567* (2014.01)
*G06T 7/90* (2017.01)
*G06T 7/20* (2017.01)
*H04N 19/186* (2014.01)

(52) U.S. Cl.
CPC ......... *H04N 19/105* (2014.11); *H04N 19/147* (2014.11); *H04N 19/176* (2014.11); *H04N 19/186* (2014.11); *H04N 19/19* (2014.11); *H04N 19/56* (2014.11); *H04N 19/567* (2014.11); *G06T 2200/04* (2013.01); *G06T 2207/10016* (2013.01); *G06T 2207/10028* (2013.01)

(56) References Cited

U.S. PATENT DOCUMENTS

| | | |
|---|---|---|
| 2004/0095999 A1 | 5/2004 | Piehl et al. |
| 2008/0205791 A1* | 8/2008 | Ideses ................. H04N 13/026 382/285 |
| 2010/0141651 A1* | 6/2010 | Tan ......................... G06T 7/579 345/420 |
| 2010/0284466 A1 | 11/2010 | Pandit et al. |

FOREIGN PATENT DOCUMENTS

| | | | |
|---|---|---|---|
| KR | 10-2009-0040028 A | 4/2009 | |
| KR | WO 2009084814 A1 * | 7/2009 | ....... H04N 21/23406 |
| WO | WO 2009/091383 A2 | 7/2009 | |

OTHER PUBLICATIONS

Oh, H. et al., H.264-Based Depth Map Sequence Coding Using Motion Information of Corresponding Texture Video, Springer-Verlag Berlin Heidelberg, 2006, pp. 898-907.

* cited by examiner

APPARATUS AND METHOD FOR MOTION ESTIMATION OF THREE DIMENSION VIDEO

CROSS-REFERENCE TO RELATED APPLICATIONS

This application is a continuation of U.S. application Ser. No. 12/805,760 filed Aug. 18, 2010, which claims priority benefit of Korean Patent Application No. 10-2009-0089356, filed on Sep. 22, 2009, in the Korean Intellectual Property Office, the disclosure of which is incorporated herein by reference.

BACKGROUND

1. Field

The exemplary embodiments relates to motion estimating apparatus and method that estimates a motion of a three-dimensional (3D) video, and more particularly, to a technology that a motion vector of a color image and a motion vector of a depth image refer to each other when a motion is estimated.

2. Description of the Related Art

A stereoscopic image is a three dimensional (3D) image that simultaneously provides configuration information about a depth and a space. Here, images taken from different viewpoints are needed to provide different images as though seen from different directions depending on a viewpoint of an observer, unlike a stereoscopic view that merely provides an image of a different viewpoint for each of a left eye and a right eye. However, it is almost impossible to compress and transmit images taken from various viewpoints in consideration of a network infrastructure, terrestrial bandwidth, and the like, since the images taken from various viewpoints have a great amount of data.

SUMMARY

According to exemplary embodiments, there may be provided an apparatus of estimating a motion of a three dimensional (3D) video, the apparatus including a color/depth motion estimating unit to estimate a motion of a depth image macroblock based on a motion vector of a color image macroblock using at least one processor, a depth/color motion estimating unit to estimate a motion of a color image macroblock based on the motion vector of the depth image macro block, and a motion estimation selecting unit to select a first estimation result by the color/depth motion estimating unit or a second estimation result by the depth/color motion estimating unit.

According to exemplary embodiments, there may be provided a method of estimating a motion of a 3D video, the method including performing a color/depth motion estimation that estimates a motion of a depth image macroblock based on a motion vector of a color image macroblock, performing a depth/color motion estimation that estimate a motion of a color image macroblock based on the motion vector of the depth image macroblock, and selecting a first estimation result by the color/depth motion estimation operation or a second estimation result by the depth/color motion estimating operation, wherein the method may be performed using at least one processor.

According to another aspect of exemplary embodiments, there is provided at least one computer readable recording medium storing computer readable instructions to implement methods of the disclosure.

According to an exemplary embodiment, there is provided a 3D video motion estimating apparatus that enables a motion vector of a color image and a motion vector of a depth image to refer to each other, thereby increasing a compression rate.

Additional aspects will be set forth in part in the description which follows and, in part, will be apparent from the description, or may be learned by practice of the exemplary embodiments.

BRIEF DESCRIPTION OF THE DRAWINGS

These and/or other aspects will become apparent and more readily appreciated from the following description of exemplary embodiments, taken in conjunction with the accompanying drawings of which.

DETAILED DESCRIPTION

Figure 1:
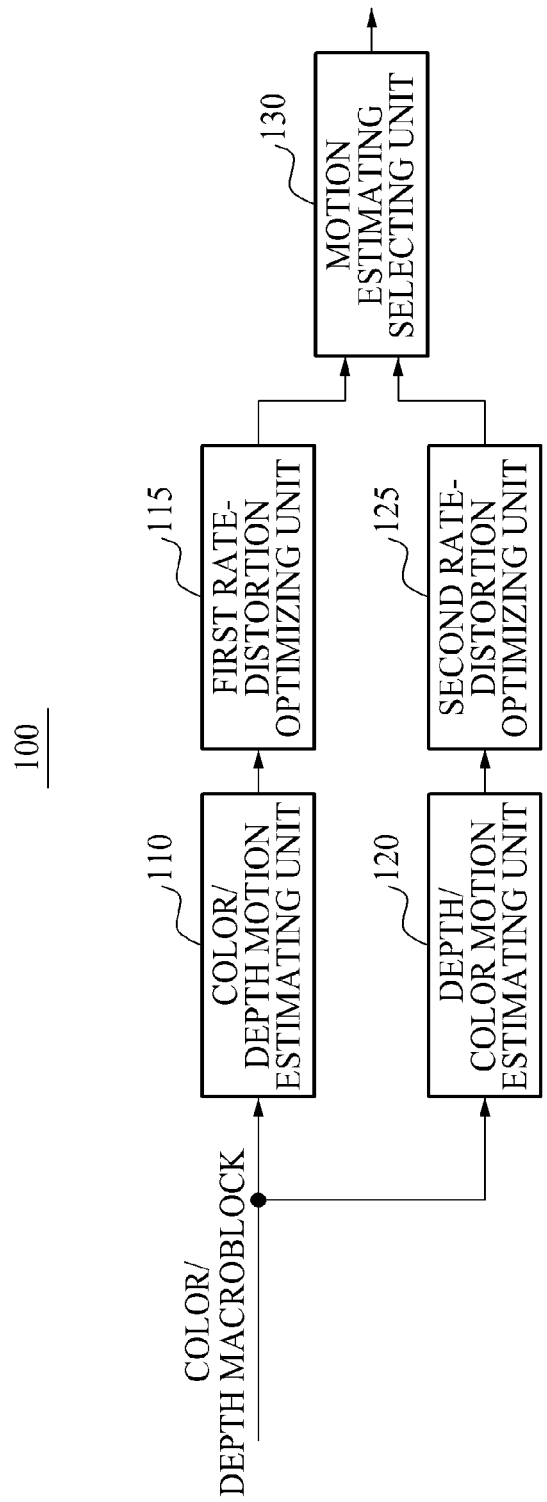
FIG. 1 is a diagram illustrating a configuration of a three-dimensional (3D) video motion estimating apparatus according to an exemplary embodiment.

Reference will now be made in detail to exemplary embodiments, examples of which are illustrated in the accompanying drawings, wherein like reference numerals refer to the like elements throughout. Exemplary embodiments are described below to explain the present disclosure by referring to the figures.

FIG. 1 is a diagram illustrating a configuration of a three-dimensional (3D) video motion estimating apparatus 100 according to an exemplary embodiment Referring to FIG. 1, the 3D video motion estimating apparatus 100 according to an exemplary embodiment includes a color/depth motion estimating unit 110, a first rate-distortion optimizing unit 115, a depth/color motion estimating unit 120, a second rate-distortion optimizing unit 125, and a motion estimation selecting unit 130. The 3D video motion estimating apparatus 100 receives an inputted color image macroblock and an inputted depth image macroblock, estimates a motion of the depth image macroblock with reference to a motion vector of the color image macroblock, estimates a motion of the color image macroblock with reference to the motion vector of the depth image macroblock, and selects a motion estimating method having a minimum cost between two results of the motion estimation. A distance between a viewer and an object in a color image is represented as the depth image based on values of 0 to 255, and a feature of the depth image is similar to the color image. Accordingly, when information about the color image and information about the depth image are appropriately utilized with each other during the compression of the color image and the depth image, efficiency is further improved compared with when the color image and the depth image are individually compressed. Therefore, when the motion vector of the color image and the motion vector of the depth image are referred to each other, the 3D video motion estimating apparatus 100 may increase a compression rate during the motion estimation.

The color/depth motion estimating unit 110 may estimate the motion of the depth image macroblock based on the motion vector of the color image macroblock. That is, the color/depth motion estimating unit 110 calculates the motion vector of the color image macroblock and then estimates the motion of the depth image motion based on the calculated color image macroblock. Hereinafter, a configuration and an operation of the color/depth motion estimating unit 110 will be further described with reference to FIG. 2.

Figure 2:
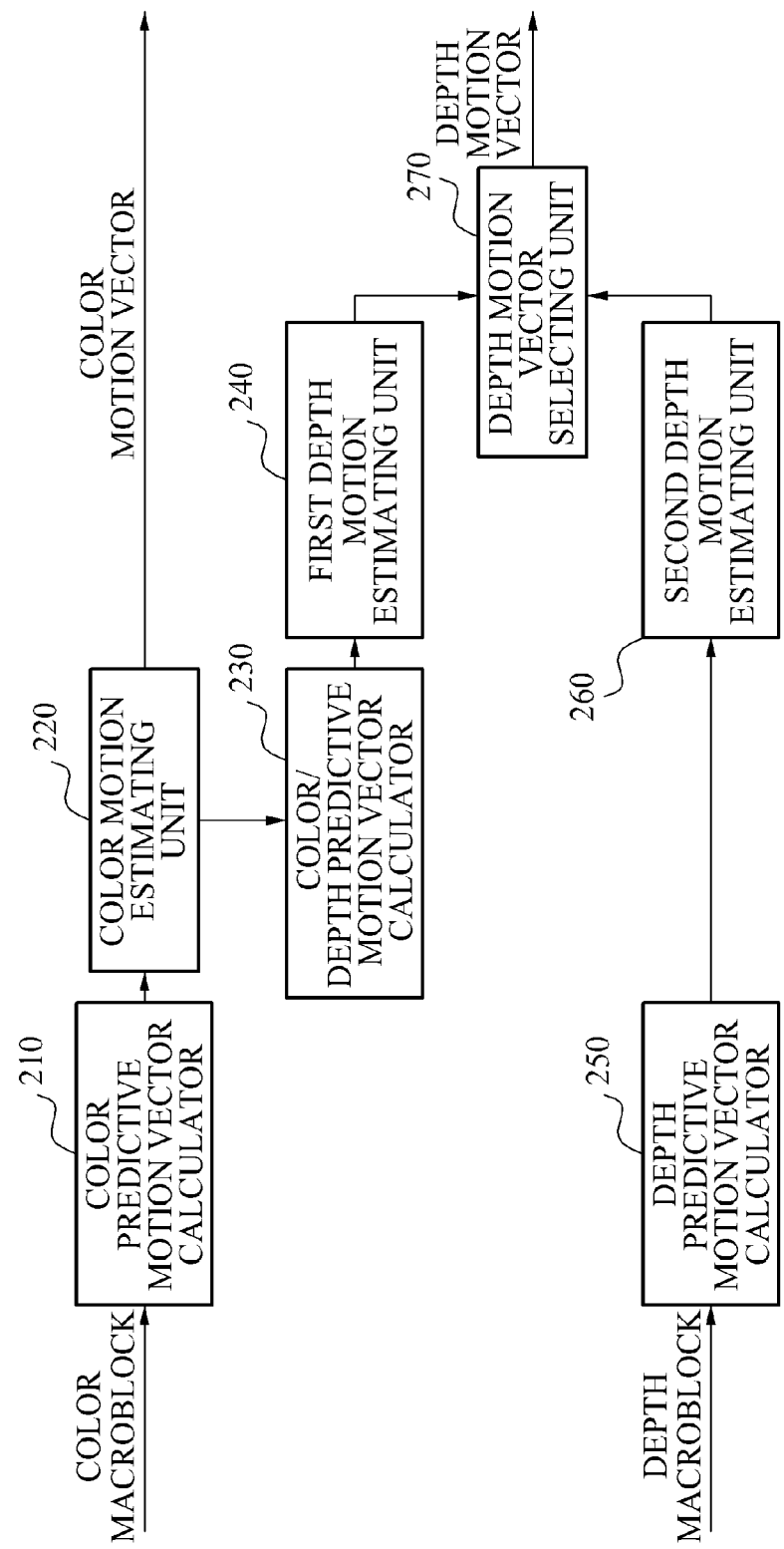
FIG. 2 is a diagram illustrating a detailed configuration of a color/depth motion estimating unit in a 3D video motion estimating apparatus according to an exemplary embodiment.

FIG. 2 is a diagram illustrating a detailed configuration of a color/depth motion estimating unit in a 3D video motion estimating apparatus according to an exemplary embodiment.

Referring to FIG. 2, the color/depth motion estimating unit 110 includes a color predictive motion vector calculator 210, a color motion estimating unit 220, a color/depth predictive motion vector calculator 230, a first depth motion estimating unit 240, a depth predictive motion vector calculator 250, a second depth motion estimating unit 260, and a depth motion vector selecting unit 270.

The color predictive motion vector calculator 210 may calculate a predictive motion vector of a color image macroblock. That is, the color predictive motion vector calculator 210 obtains a vector by calculating a median of vertical directions of motion vectors of blocks adjacent to a current input block in the color image macroblock and a median of horizontal directions of motion vectors of blocks adjacent to the current input block in the color image macroblock, the adjacent blocks including a left block, an upper block, and an upper-right block, and uses the vector as the predictive motion vector.

The color motion estimating unit 220 may estimate a motion from a color image based on the predictive motion vector of the color image macro block and may estimate a final motion vector of the color image macroblock. That is, the color motion estimating unit 220 estimates the motion from the color image based on the calculated predictive motion vector of the color image macroblock to estimate the final motion vector of the color image macroblock.

The color/depth predictive motion vector calculator 230 may use the motion vector of the color image macroblock as a predictive motion vector of a depth image? macroblock.

The first depth motion estimating unit 240 may estimate a motion from a depth image based on the predictive motion vector of the depth image macroblock, the predictive motion vector being calculated by the color/depth predictive motion vector calculator 230, and may estimate a final motion vector of the depth image macroblock.

The depth predictive motion vector calculator 250 may calculate a predictive motion vector of the depth image macroblock. That is, the depth predictive motion vector calculator 250 obtains a vector by calculating a median of vertical directions of motion vectors of blocks adjacent to a current input block in the depth image macroblock and a median of horizontal directions of motion vectors of blocks adjacent to the current input block in the depth image macroblock, the adjacent blocks including a left block, an upper block, and an upper-right block, and uses the vector as the predictive motion vector of the depth image macroblock.

The second depth motion estimating unit 260 may estimate a motion from the depth image based on the predictive motion vector of the depth image macroblock, the predictive motion vector being calculated by the depth predictive motion vector calculator 250, and may estimate a final motion vector of the depth image macroblock.

The depth motion vector selecting unit 270 may compare a result of the depth estimation performed by the first depth motion estimating unit 240 and a result of the depth estimation performed by the second depth motion estimating unit 260, and may select a depth motion vector having a minimum motion cost function. The motion cost is calculated based on an error value that is calculated by summing an inputted block and an absolute value of a differential value of a reference block indicated by the motion vector, and also based on a number of bits required for compressing the motion vector. That is, the depth motion vector selecting unit 270 may compare motion costs corresponding to two motion vectors obtained by calculating the motion vector of the depth image macroblock, and may select the motion vector having a minimum cost as a final motion vector with respect to the depth image macroblock.

The first rate-distortion optimizing unit 115 may optimize a rate-distortion of a final motion vector with respect to the color image macroblock and the depth image macroblock, the final motion vector being estimated by the color/depth motion estimating unit 110. That is, the first rate-distortion optimizing unit 115 calculates a rate-distortion cost function with respect to the final motion vector of the color image macroblock and the depth image macroblock, the final motion vector of the color image macroblock and the depth image macroblock being estimated by the color/depth motion estimating unit 110, to optimize a rate-distortion considering an amount of error and a number of bits based on the final motion vector of the color image macroblock and depth image macroblock, the final estimation vector being estimated by the color/depth motion estimating unit 110.

The depth/color motion estimating unit 120 estimates a motion of the color image macroblock based on a motion of the depth image macroblock. That is, the depth/color motion estimating unit 120 calculates a motion vector of the depth image macroblock and then estimates the motion of the color image based on the calculated motion vector of the depth image macroblock. Hereinafter, a configuration and an operation of the depth/color motion estimating unit 120 will be described in detail with reference to FIG. 3.

Figure 3:
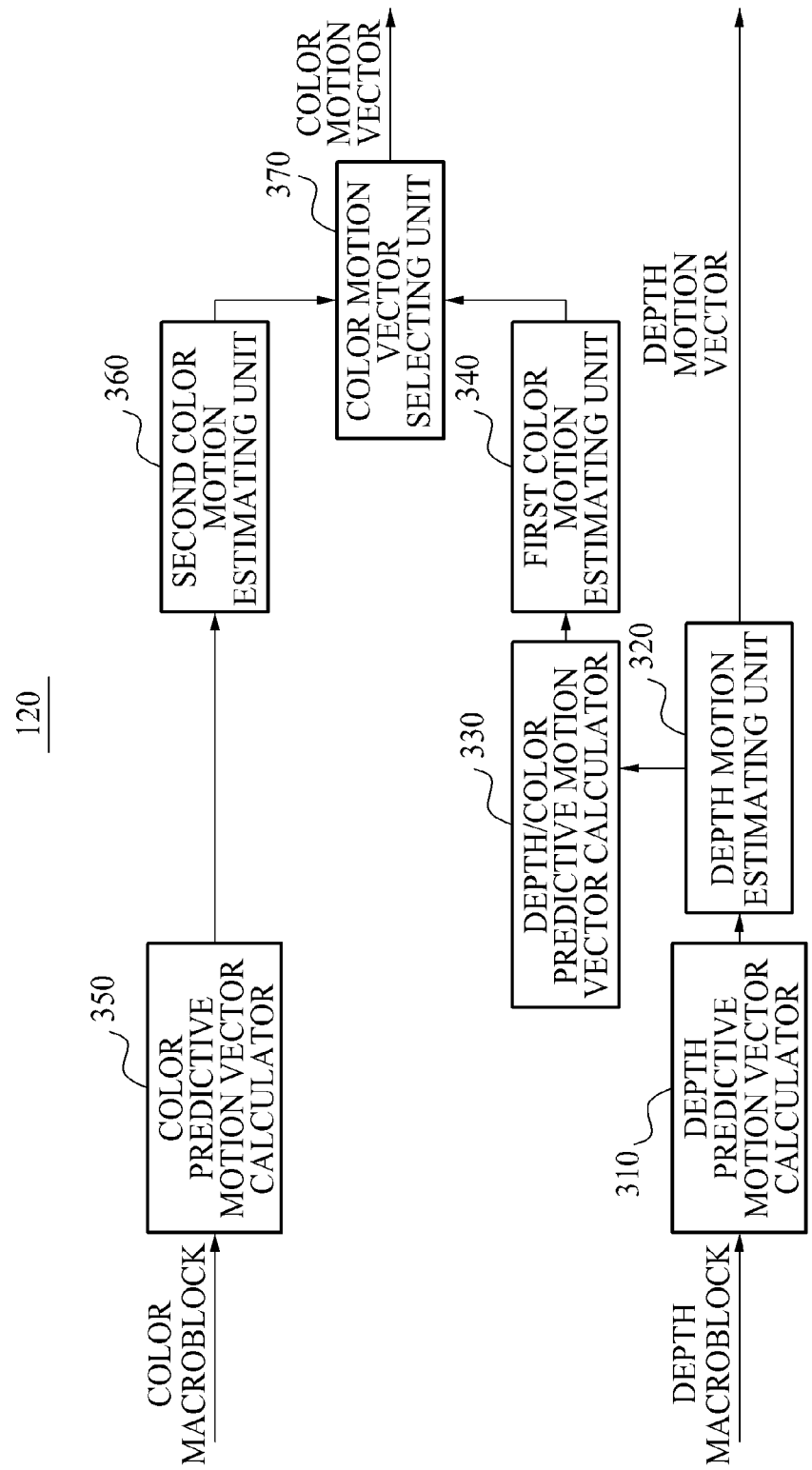
FIG. 3 is a diagram illustrating a detailed configuration of a depth/color motion estimating unit in a 3D video motion estimating apparatus according to an exemplary embodiment.

FIG. 3 is a diagram illustrating a detailed configuration of a depth/color motion estimating unit in a 3D video motion estimating apparatus according to an exemplary embodiment.

Referring to FIG. 3, the depth/color motion estimating unit 120 includes a depth predictive motion vector 310, a depth motion estimating unit 320, a color/depth predictive motion vector calculator 330, a first color motion estimating unit 340, a color predictive motion vector calculator 350, a second color motion estimating unit 360, and a color motion vector selecting unit 370.

The depth predictive motion vector calculator 310 may calculate a predictive motion vector of a depth image macroblock. That is, the depth predictive motion vector calculator 310 obtains a vector by calculating a median of vertical directions of motion vectors of blocks adjacent to a current input block and a median of horizontal directions of motion vectors of blocks adjacent to the current input block, the adjacent blocks including a left block, an upper block, and an upper-right block, and uses the vector as the predictive motion vector of the depth image macroblock.

The depth motion estimating unit 320 may estimate a motion from a depth image based on the predictive motion vector of the depth image macroblock. That is, the depth motion estimating unit 320 estimates the motion from the depth image based on the predictive motion vector of the depth image macroblock, the predictive motion vector being calculated by the depth predictive motion vector calculator 310, and may estimate a final motion vector of the depth image macroblock.

The depth/color predictive motion vector calculator 330 uses the final motion vector of the depth image macroblock as a predictive motion vector of a color image macroblock.

The first color motion estimating unit 340 estimates a motion from a color image based on the predictive motion vector of the color image macroblock, the predictive motion vector being calculated by the predictive depth/color motion vector calculator 330, and estimates a final motion vector of the color image macroblock.

The color predictive motion vector calculator 350 calculates a predictive motion vector of the color image macroblock. That is, the color predictive motion vector calculator 350 obtains a vector by calculating a median of vertical directions of motion vectors of blocks adjacent to a current input block in the color image macroblock and a median of horizontal directions of motion vectors of blocks adjacent to the current input block in the color image macroblock, the adjacent blocks including a left block, an upper block, and an upper-right block, and uses the vector as the predictive motion vector.

The second color motion estimating unit 360 estimates a motion from the color image based on the predictive motion vector of the color image macroblock, the predictive motion vector being calculated by the color predictive motion vector calculator 350, and estimates a final motion vector of the color image macroblock.

The color motion vector selecting unit 370 compares a result of the color estimation performed by the first color motion estimating unit 340 with a result of the color estimation performed by the second color motion estimating unit 360, and selects a color motion vector having a minimum motion cost function. That is, the color motion vector selecting unit 370 compares a motion cost corresponding to a color motion vector estimated by the first color motion estimating unit 340 and a motion cost corresponding to a color motion vector estimated by the second color motion estimating unit 360, and selects the color motion vector having the minimum motion cost as a final motion vector of the color image macroblock.

The second rate-distortion optimizing unit 125 optimizes a rate-distortion of the final motion vector with respect to the depth image macroblock and the color image macroblock, the final motion vector being estimated by the depth/color motion estimating unit 120. That is, the second rate-distortion optimizing unit 125 calculates a rate-distortion cost function with respect to the final motion vector of the depth image macroblock and the color image macroblock, the final motion vector being estimated by the depth/color motion estimating unit 120, to optimize a rate-distortion considering an amount of error and a number of bits based on the final motion vector with respect to depth image macroblock and the color image macroblock. Hereinafter, a configuration and an operation of the rate-distortion optimizing units 115 and 125 will be described in detail with reference to FIG. 4.

Figure 4:
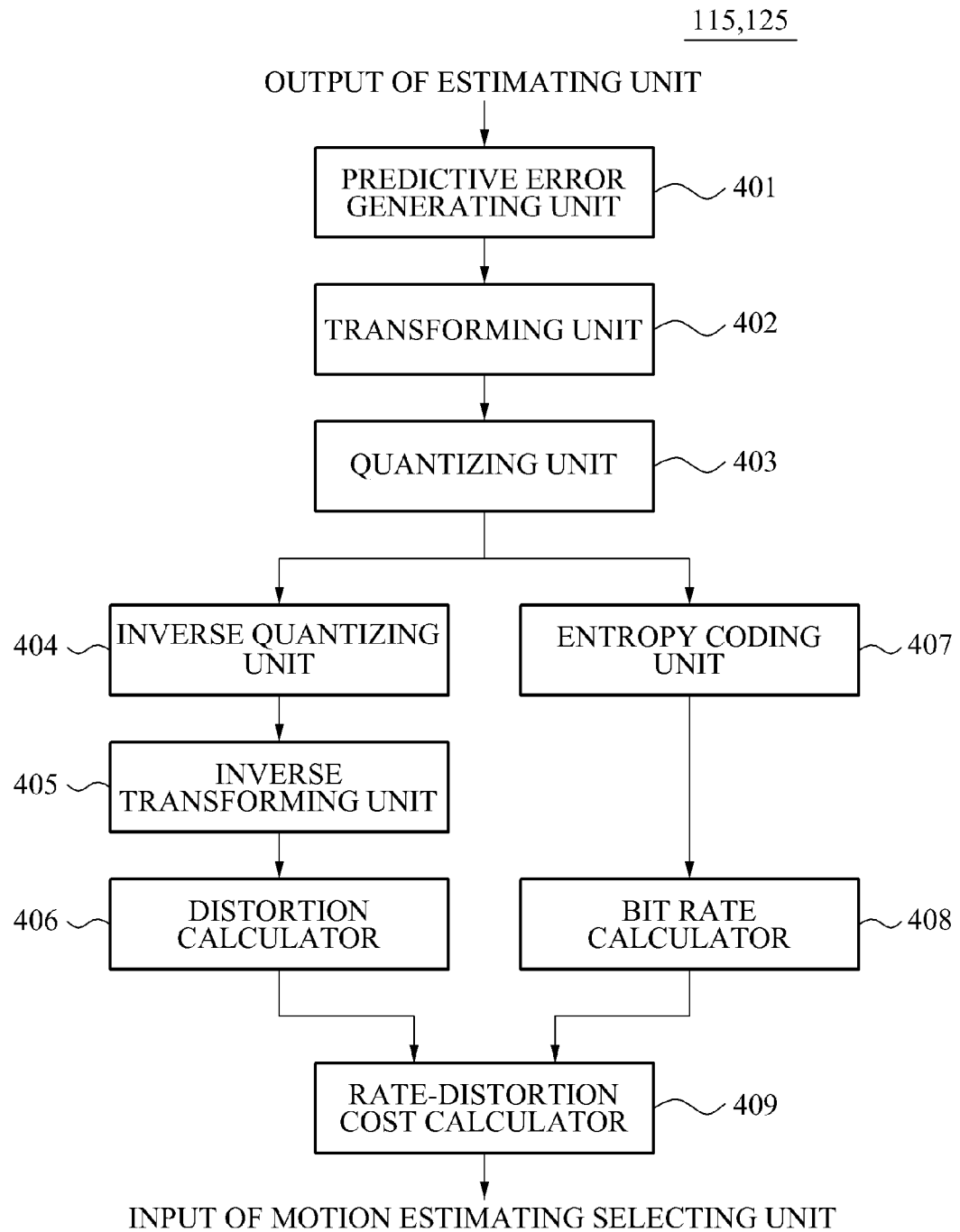
FIG. 4 is a diagram illustrating a detailed configuration of a rate-distortion optimizing unit of a 3D video motion estimating apparatus according to an exemplary embodiment.

FIG. 4 is a diagram illustrating a detailed configuration of a rate-distortion optimizing unit of a 3D video motion estimating apparatus according to an exemplary embodiment.

Referring to FIG. 4, the first rate-distortion optimizing unit 115 or the second rate-distortion optimizing unit 125 includes a predictive error generating unit 401, a transforming unit 402, a quantizing unit 403, an inverse quantizing unit 404, an inverse transforming unit 405, a distortion calculator 406, an entropy coding unit 407, a bit rate calculator 408, and rate-distortion cost calculator 409.

The predictive error generating unit 401 differentiates pixel values of a macroblock and pixel values of a reference block indicated by a motion vector to generate predictive error values. That is, the predictive error generating unit 401 differentiates pixel values of a macroblock with respect to a color motion vector or a depth motion vector and the pixel values of the reference block indicated by the motion vector to generate predictive error values with respect to a color image macroblock or a depth image macroblock.

The transforming unit 402 transforms the predictive error values into coefficients of a frequency domain through a discrete cosine transform (DCT). That is, the transforming unit 402 may transform the predictive error values with respect to the macroblock of the color motion vector or the depth motion vector into the coefficients of the frequency domain through the discrete cosine transform for space compression.

The quantizing unit 403 quantizes the transformed coefficients. That is, the quantizing unit 403 quantizes the coefficients transformed with respect to the macroblock of the color motion vector or the depth motion vector.

The inverse quantizing unit 404 inverse quantizes the quantized coefficient. That is, the inverse quantizing unit 404 inverse quantizes the coefficient quantized with respect to the macroblock of the color motion vector or the depth motion vector.

The inverse transforming unit 405 inverse transforms the inverse quantized coefficients into values of an image domain. That is, the inverse transforming unit 405 inverse transforms the coefficients inverse quantized with respect to the macroblock of the color motion vector or the depth motion vector into the values of the image domain.

The distortion calculator 406 calculates an amount of data lost when predictive error values which are compressed at an encoder and are decoded at a decoder and the differential values of the predictive error values are compressed. That is, the distortion calculator 406 squares and sums the differential values to estimate the data lost.

The entropy coding unit 407 performs entropy-code of the quantized coefficients. That is, the entropy coding unit 407 performs entropy-code of the coefficients quantized with respect to the macroblock of the color motion vector or the depth motion vector.

The bit rate calculator 408 calculates a total bit rate that is finally compressed and encoded with respect to the macroblock of the color motion vector or the depth motion vector.

The rate-distortion calculator 409 calculates the rate-distortion cost function based on the amount of data lost and the total bit rate.

The first rate-distortion optimizing unit 115 or the second rate-distortion optimizing unit 125 may calculate the rate-distortion cost function to select an optimal motion estimating method between the color/depth motion estimating method and the depth/color motion estimating method.

The motion estimation selecting unit 130 selects a first estimation result performed by the color/depth motion estimating unit 110 or a second estimation result performed by the depth/color motion estimating unit 120. That is, the motion estimation selecting unit 130 selects a estimation result having a minimum rate-distortion cost function between the rate-distortion cost function of the color motion vector and the depth motion vector of the first estimation result and the rate-distortion cost function of the depth motion vector and the color motion vector of the second estimation result, the first estimation being calculated by the first rate-distortion optimizing unit 115 and the second estimation being calculated by the second rate-distortion optimizing unit 125.

Figure 5:
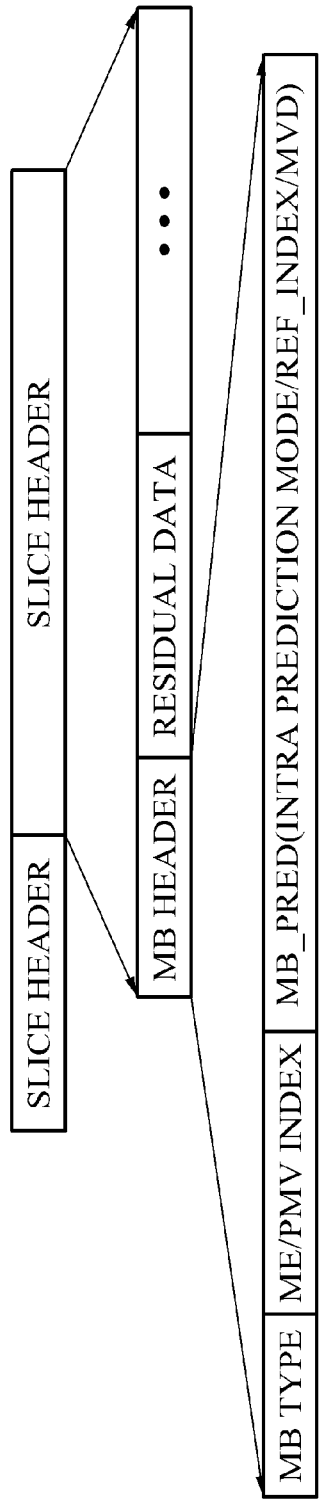
FIG. 5 is a diagram illustrating a format of a macroblock according to an exemplary embodiment.

FIG. 5 is a diagram illustrating a format of a macroblock according to an exemplary embodiment.

Referring to FIG. 5, according to an exemplary embodiment, an encoder uses two bits as an index in a structure of a macroblock when a compression is performed, to enable a decoder to recognize a type of a motion estimating method and a type of predictive motion vector. The index is located between an MB Type indicating a type of a macroblock and an MB_Pred indicating an index of an image and the like, the index being referred to while the motion is estimated. As an example, when the index is "00", the index may indicate that the motion estimating method is a color/depth motion estimating method, and a color motion vector is used as a predictive motion vector of a depth image macroblock?. As another example, when the index is "01", the index may indicate that the motion estimating method is the color/depth motion estimating method, and a motion vector calculated based on a median of adjacent blocks is used as the predictive motion vector of the depth image macroblock. As another example, when the index is "10", the index indicates that the motion estimating method is a depth/color motion estimating method, and a depth motion vector is used as a predictive motion vector of a color macroblock. As another example, when the index is "11", the index indicates that the motion estimating method is the depth/color motion estimating method, and a motion vector calculated based on a median of adjacent blocks is used as the predictive motion vector of the color image macroblock.

As described above, the 3D video motion estimating apparatus 100 according to an exemplary embodiment may have a more improved efficiency rate compared with when a color image and a depth image are individually compressed, since a motion vector of the color image and a motion vector of the depth image are referred to with each other during the motion estimation.

Figure 6:
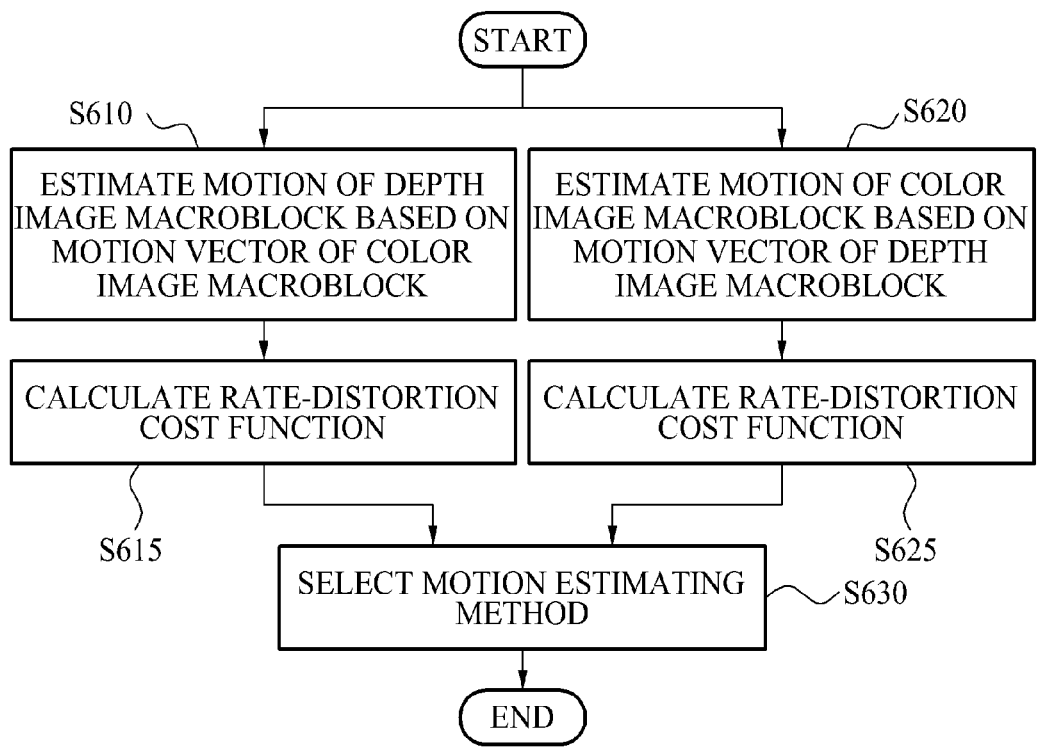
FIG. 6 is a flowchart illustrating a 3D video motion estimating method according to an exemplary embodiment.

FIG. 6 is an operational flowchart illustrating a 3D video motion estimating method according to an exemplary embodiment.

Referring to FIG. 6, a 3D video motion estimating apparatus estimates a motion of a depth image macroblock based on a motion vector of a color image macroblock in operation S610. That is, the 3D video motion estimating apparatus calculates the motion vector of the color image macroblock and then estimates the motion of the depth image macroblock based on the calculated motion vector of the color image macroblock in operation S610. Hereinafter, an operation of color/depth motion estimation in operation S610 will be further described with reference to FIG. 7.

Figure 7:
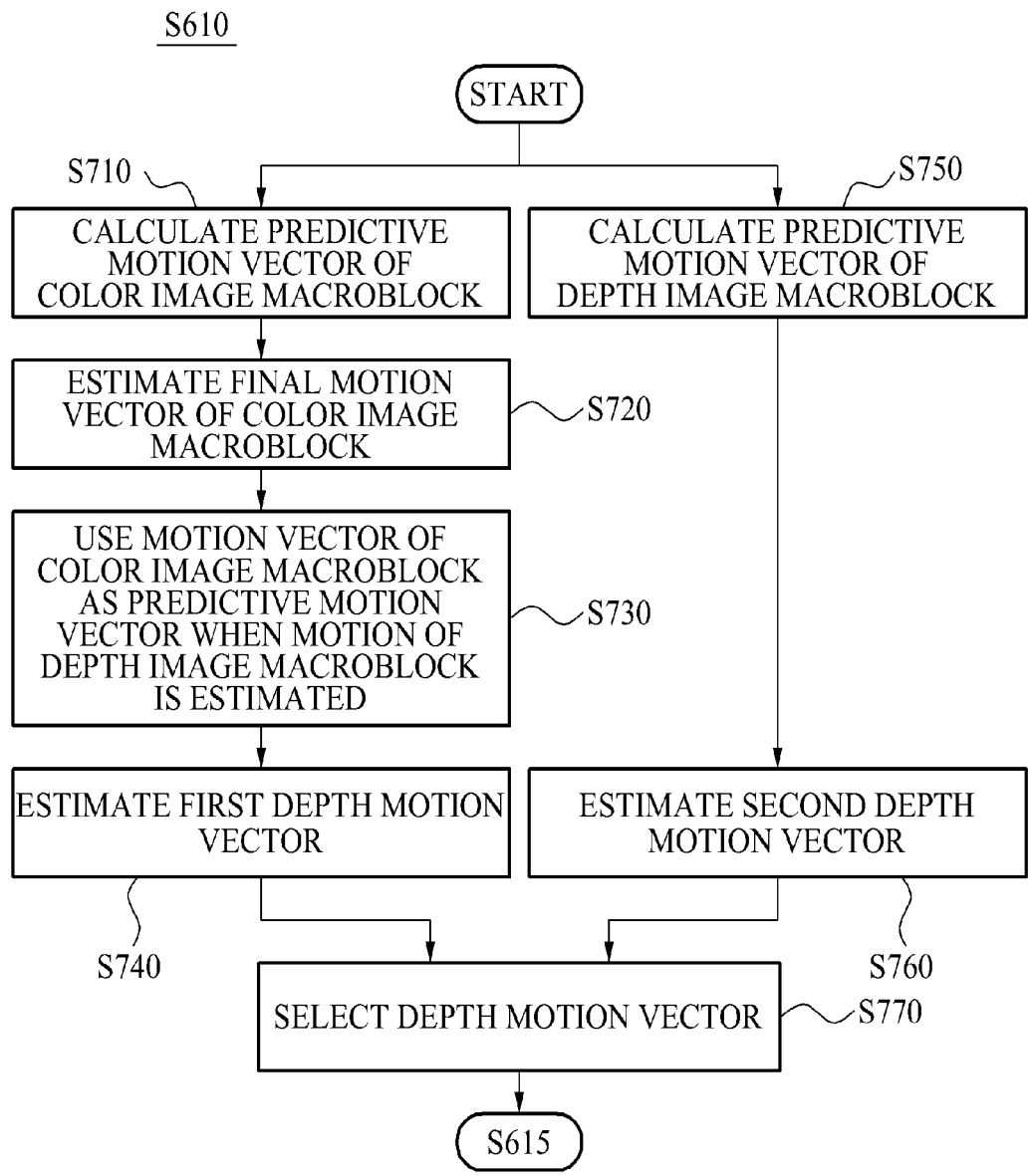
FIG. 7 is a diagram illustrating a detailed operation of a color/depth motion estimation of a 3D video motion estimating method according to an exemplary embodiment.

FIG. 7 is a diagram illustrating a detailed operation of a color/depth motion estimation of a 3D video motion estimating method according to an exemplary embodiment.

Referring to FIG. 7, in operation S710, the 3D video motion estimating apparatus calculates a predictive motion vector of a color image macroblock. That is, the 3D video motion estimating apparatus obtains a vector by calculating a median of vertical directions of motion vectors of blocks adjacent to a current input block and a median of horizontal directions of motion vectors of blocks adjacent to the current input block, the adjacent blocks including a left block, an upper block, and an upper-right block, and uses the vector as the predictive motion vector of the color image macroblock.

In operation S720, the 3D video motion estimating apparatus estimates a motion from a color image based on the predictive motion vector of the color image macroblock, and estimates a final motion vector of the color image macroblock.

In operation S730, the 3D video motion estimating apparatus uses the final motion vector of the color image macroblock as a predictive motion vector when the motion of the depth image macroblock is estimated.

In operation S740, the 3D video motion estimating apparatus estimates a motion from a depth image based on the predictive motion vector of the depth image macroblock, and estimates a final motion vector of the depth image macroblock.

In operation S750, the 3D video motion estimating apparatus calculates a predictive motion vector of the depth image macroblock. That is, the 3D video motion estimating apparatus obtains a vector by calculating a median of vertical directions of motion vectors of blocks adjacent to a current input block and a median of horizontal directions of motion vectors of blocks adjacent to the current input block, the adjacent blocks including a left block, an upper block, and an upper-right block, and uses the vector as the predictive motion vector of the depth image macroblock.

In operation S760, the 3D video motion estimating apparatus estimates a motion from the depth image based on the calculated predictive motion vector of the depth image macroblock, and estimates a final motion vector of the depth image macroblock.

In operation S770, the 3D video motion estimating apparatus compares a result of estimation of the first depth motion vector in operation S740 and a result of estimation of the second depth motion vector in operation S760, and selects a depth motion vector having a minimum motion cost function. That is, in operation S770, the 3D video motion estimating apparatus determines an efficiency of predictive motion vectors used for motion estimation, and determines a final motion vector of the depth image macroblock.

In operation S615, the 3D video motion estimating apparatus optimizes a rate-distortion with respect to a motion of the color and depth image macroblock, the motion being estimated in operation S610. That is, the 3D video motion estimating apparatus calculates a rate-distortion cost function with respect to the final motion vector the color and the depth image macroblock, to optimize the rate-distortion considering an amount of error and a number of bits based on the final motion vector of the color and the depth image macroblock, the final motion vector being estimated in operation S610.

In operation S620, the 3D video motion estimating apparatus estimates a motion of the color image macroblock based on the motion vector of the depth image macroblock. That is, in operation S620, the 3D video motion estimating apparatus calculates the motion vector of the depth image macroblock and then calculates a motion of the color image based on the calculated motion vector of the depth image macroblock. Hereinafter, an operation of the depth/color motion estimation in operation S620 will be further described with reference to FIG. 8.

Figure 8:
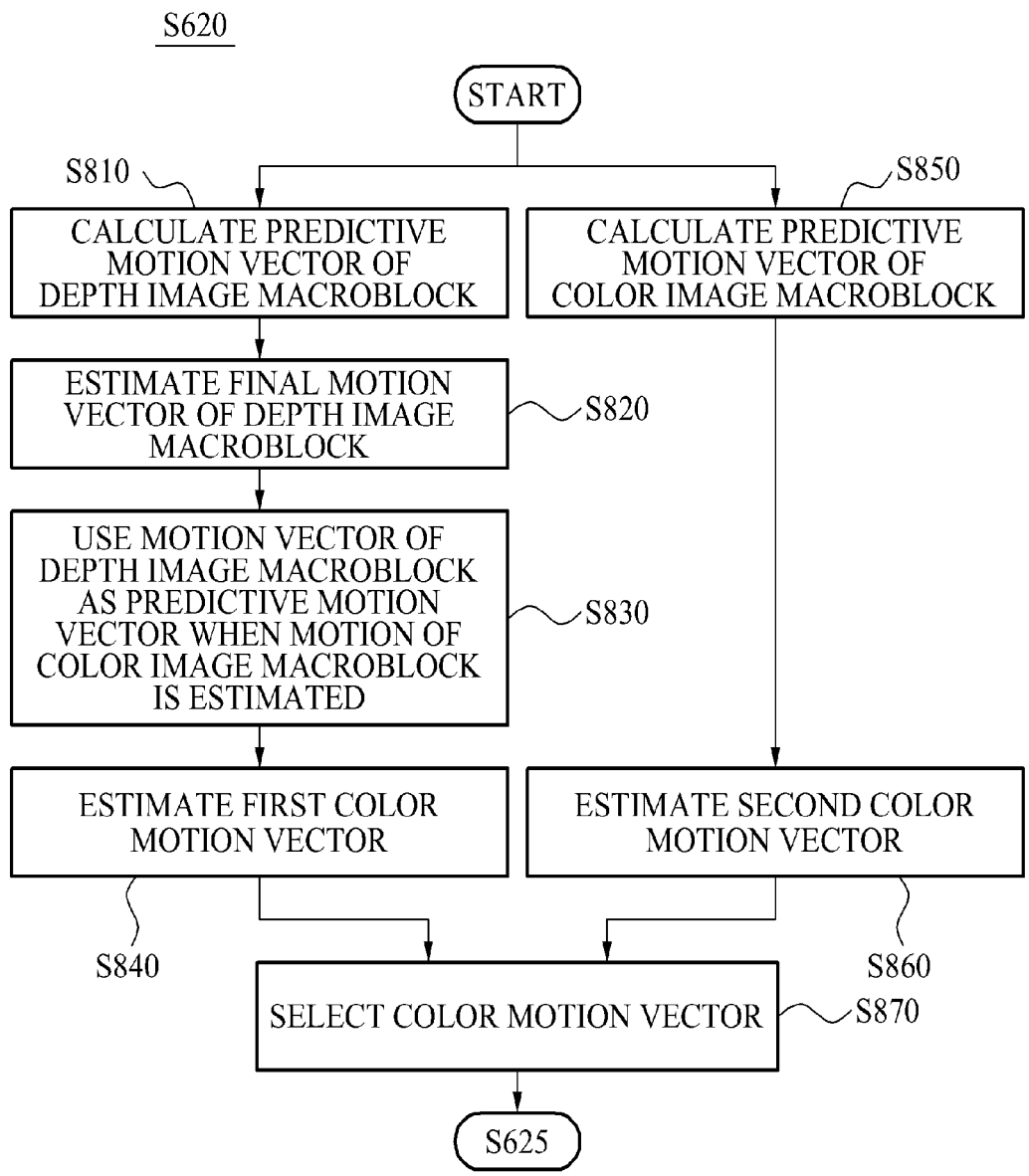
FIG. 8 is a diagram illustrating a detailed operation of a depth/color motion estimation of a 3D video motion estimating method according to an exemplary embodiment.

FIG. 8 is a diagram illustrating a detailed operation of a depth/color motion estimation of a 3D video motion estimating method according to an exemplary embodiment.

In operation S810, the 3D video motion estimating apparatus calculates a predictive motion vector of a depth image macroblock. That is, the 3D video motion estimating apparatus obtains a vector by calculating a median of vertical directions of motion vectors of blocks adjacent to a current input block and a median of horizontal directions of motion vectors of blocks adjacent to the current input block, the adjacent blocks including a left block, an upper block, and an upper-right block, and uses the vector as the predictive motion vector of the depth image macroblock.

In operation S820, the 3D video motion estimating apparatus estimates a motion from a depth image based on the predictive motion vector of the depth image macroblock, and estimates a final motion vector of the depth image macroblock.

In operation S830, the 3D video motion estimating apparatus uses the final motion vector of the depth image macroblock as a predictive motion vector when a motion of a color image macroblock is estimated.

In operation S840, the 3D video motion estimating apparatus estimates the motion from the color image based on the calculated predictive motion vector of the color image macroblock, and estimates a final motion vector of the color image macroblock.

In operation S850, the 3D video motion estimating apparatus calculates a predictive motion vector of the color image macroblock. That is, in operation S850, the 3D video motion estimating apparatus obtains a vector by calculating a median of vertical directions of motion vectors of blocks adjacent to a current input block and a median of horizontal directions of motion vectors of blocks adjacent to the current input block, the adjacent blocks including a left block, an upper block, and an upper-right block, and uses the vector as the predictive motion vector of the color image macroblock.

In operation S860, the 3D video motion estimating apparatus estimates a motion from the color image based on the calculated predictive motion vector of the image macroblock, and estimates a final motion vector of the color image macroblock.

In operation S870, the 3D video motion estimating apparatus compares a result of estimating a first color motion vector and a result of estimating a second color motion vector, and selects a color motion vector having a minimum motion cost function. That is, in operation S870, the 3D video motion estimating apparatus determines an efficiency of predictive motion vectors used when the motion of the color image macroblock is estimated, and selects a final motion vector of a final image macroblock.

In operation S625, the 3D video motion estimating apparatus calculates a rate-distortion cost function with respect to the second estimation result of operation S620. That is, in operation S625, the 3D video motion estimating apparatus calculates the rate-distortion cost function with respect to a depth motion vector and a color motion vector of the second estimation result in operation S620, and optimizes a rate-distortion. Hereinafter, an operation of optimizing the rate-distortion in operations S615 and S625 will be further described with reference to FIG. 9.

Figure 9:
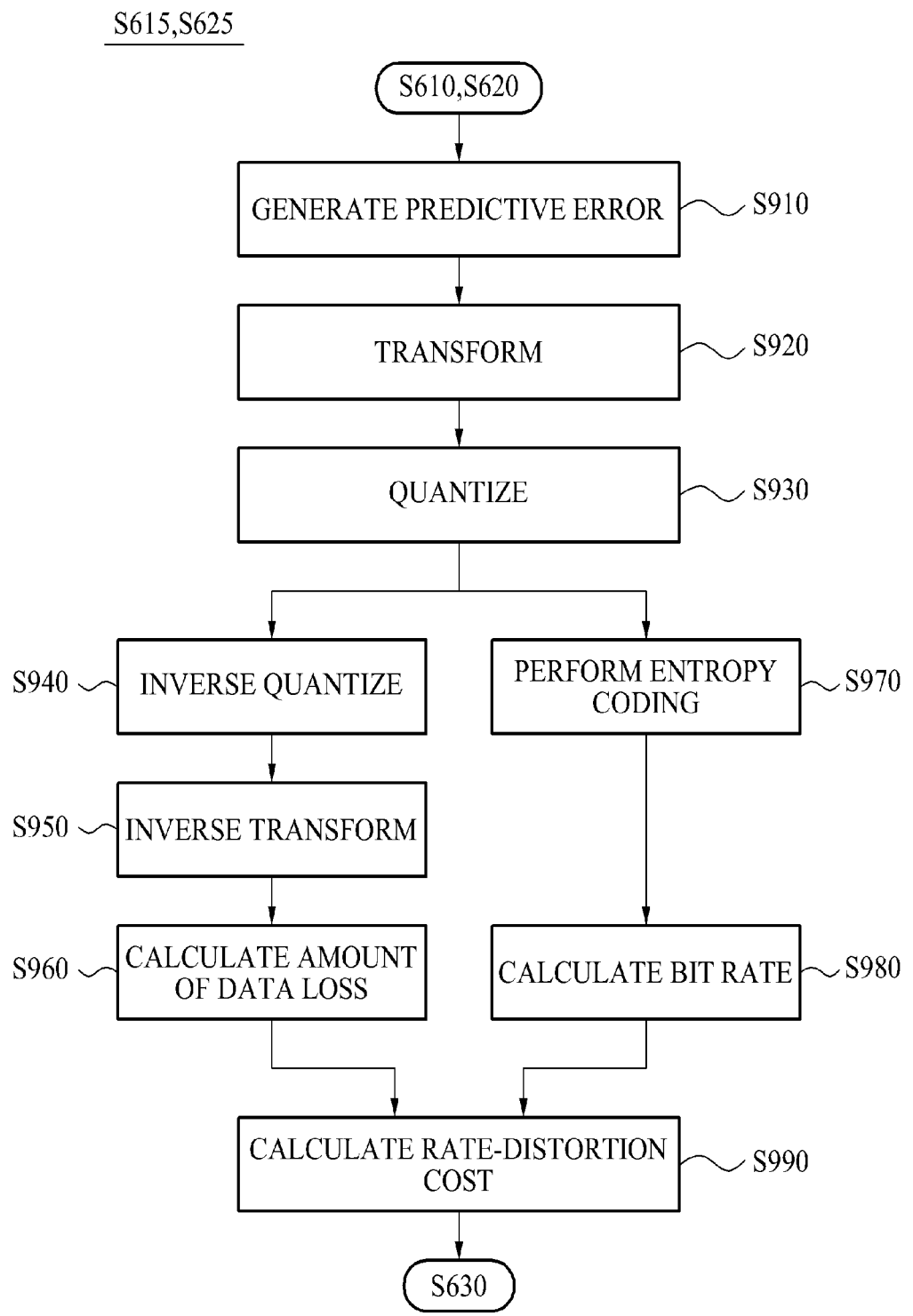
FIG. 9 is a diagram illustrating a detailed operation of a rate-distortion optimization of a 3D video motion estimating method according to an exemplary embodiment.

FIG. 9 is a diagram illustrating a detailed operation of a rate-distortion optimization of a 3D video motion estimating method according to an exemplary embodiment.

Referring to FIG. 9, in operation S910, the 3D video motion estimating apparatus differentiates pixel values of a macroblock and pixels values of a reference block indicated by a motion vector, and generates a predictive error value.

In operation S920, the 3D video motion estimating apparatus transforms the predictive error values into coefficients of a frequency domain through a DCT.

In operation S930, the 3D video motion estimating apparatus quantizes the transformed coefficients.

The 3D video motion estimating apparatus inverse quantizes the quantized coefficients in operation S940, inverse transforms the inverse quantized coefficients into values of an image domain in operation S950, and calculates an amount of data lost when the predictive error values which is compressed at an encoder and decoded at decoder and differential values of the predictive error values are compressed in operation S960.

The 3D video motion estimating apparatus performs entropy coding of the quantized coefficients in operation S970, and calculates an entropy-coded total bit rate in operation S980.

In operation S990, the 3D video motion estimating apparatus calculates the rate-distortion cost function based on the amount of data lost and the total bit rate.

In operation S630, the 3D video motion estimating apparatus selects a first estimation result of operation S610 or a second estimation result of operation S620. That is, in operation S630, the 3D video motion estimating apparatus compares a calculation result of a rate-distortion cost function with respect to the first estimation result with a calculation result of a rate-distortion cost function with respect to the second estimation result, and selects a motion estimation vector having a minimum rate-distortion cost function.

As described above, the motion vector of the color image and the motion vector of the depth image refer to each other during the motion estimation, and thus, the 3D video motion estimating method may have high compression rate.

The 3D video motion estimating method according to the above-described exemplary embodiments may be recorded in a computer readable medium or computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. The computer-readable media may also be a distributed network, so that the program instructions are stored and executed in a distributed fashion. The program instructions may be executed by one or more processors or processing devices. The computer-readable media may also be embodied in at least one application specific integrated circuit (ASIC) or Field Programmable Gate Array (FPGA). Examples of program instructions include both machine code, such as produced by a compiler, and files containing higher level code that may be executed by the computer using an interpreter. The described hardware devices may be configured to act as one or more software modules in order to perform the operations of the above-described exemplary embodiments, or vice versa.

Although a few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. A apparatus of estimating a motion of a three dimensional (3D) video, comprising:
   a receiver configured to receive a color image macroblock and a depth image macroblock; and
   a determiner configured to determine a motion vector of the color image macroblock and to determine a motion of the depth image macroblock based on the determined motion vector of the color image macroblock,
   wherein the determined motion vector of the color image macroblock is used as a motion vector for the depth image macroblock.

2. The apparatus of claim 1, wherein the determiner is further configured to determine the motion vector of the color image macroblock and then to determines the motion of the depth image macroblock based on the determined motion vector of the color image macroblock.

3. The apparatus of claim 1, wherein a predictive motion vector is determined based on a median of vertical directions of motion vectors of blocks adjacent to a current input block in the color image macroblock and a median of horizontal directions of motion vectors of blocks adjacent to the current input block in the color image macro block, and
   wherein the determiner is further configured to determine the motion vector of the color image macroblock based on the predictive motion vector.

4. The apparatus of claim 3, wherein the determiner is further configured to estimate a motion from a color image based on the predictive motion vector to estimate a final motion vector of the color image macroblock.

5. The apparatus of claim 3, wherein the blocks adjacent to the current input block comprises a left block, an upper block, and an upper-right block of the current input block.

6. A non-transitory computer readable medium storing computer readable instructions that control at least one processor to implement operations comprising:
   receiving a color image macroblock and a depth image macroblock; and
   determining a motion vector of the color image macroblock and determining a motion of the depth image macroblock based on the determined motion vector of the color image macroblock,
   wherein the determined motion vector of the color image macroblock is used as a motion vector for the depth image macroblock.

7. The non-transitory computer readable medium of claim 6, wherein the instructions for determining the motion vector of the color image block and determining the motion of the depth image macroblock comprises instructions for:
   determining the motion vector of the color image macroblock and then determining the motion of the depth image macroblock based on the determined motion vector of the color image macroblock.

* * * * *